Oct. 23, 1962     A. LODGE     3,059,666

AIR FILTER

Filed June 9, 1961

INVENTOR.
BY Alvin Lodge
Ralph Hammer

United States Patent Office 3,059,666
Patented Oct. 23, 1962

3,059,666
AIR FILTER
Alvin Lodge, Erie, Pa., assignor to American Sterilizer Company, Erie, Pa., a corporation of Pennsylvania
Filed June 9, 1961, Ser. No. 115,975
4 Claims. (Cl. 137—512)

This invention is a device which filters and purifies the air that enters a distilled water storage tank when water is drawn off. It also serves as an overflow.

Figure 1:
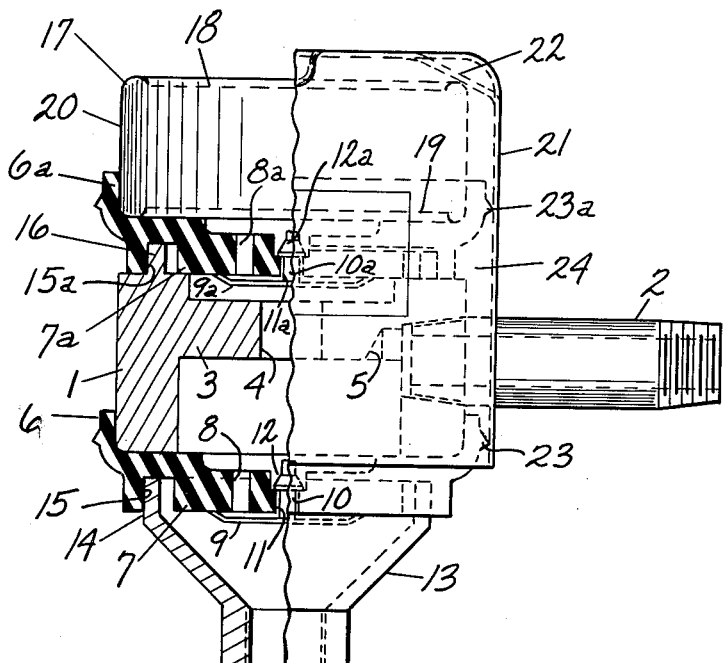
Figure 2:
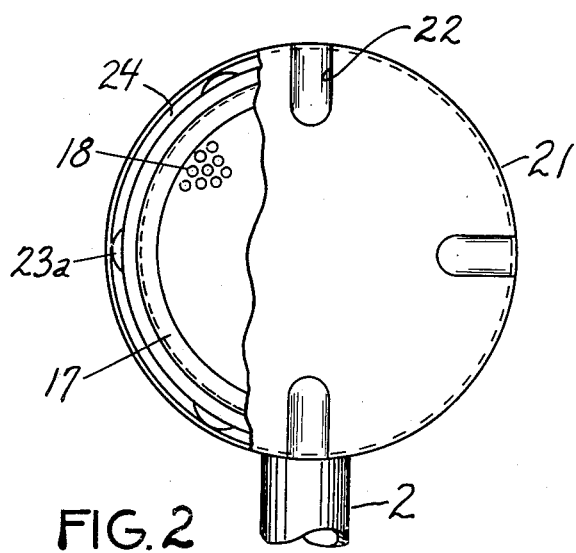

In the drawing, FIG. 1 is a side elevation, partly in section, of a preferred form of air filter and FIG. 2 is a top plan view.

At the center of the filter is an inverted cup shaped housing 1 having fixed in one side a nipple 2 for connection to the tank into which air is to be admitted as water is withdrawn. The housing has a top wall 3 with a small diameter central opening 4. The housing also has an integral deflector 5 opposite the nipple which deflects downward any water flowing back through the nipple in case the tank is filled to overflow. The lower end of the housing 1 is seated within an upstanding cylindrical wall 6 integral with a rubber member 7. The as molded inside diameter of the wall 6 is less than the outside diameter of the lower end of the housing 1. When the housing is inserted, there accordingly is a tight grip which both provides an air tight seal to the lower end of a housing and a firm but releasable mechanical connection to the rubber member. At the center of the rubber member 7 are a plurality of drain holes 8, normally closed by a check valve disc 9 integral with a rubber stem 10 suitably anchored in a center opening 11, for example by a collar 12 on the stem. The check valve disc 9 is of thin rubber and overlaps the drain openings 8 and normally seals the openings.

When water overflows through the nipple 2, it flows downward through the drain openings into a funnel 13 having a rim 14 seated in a groove 15 on the under side of the rubber member 7. The outside diameter of the rim 14 of the funnel is greater than the diameter of the groove 15 so that upon insertion of the rim into the groove, the funnel is securely gripped. The funnel drains by gravity to any suitable drain.

Above the housing 1 is another rubber member of construction identical with the rubber member 7, corresponding parts being indicated by the same reference numerals with the subscript "a." On the upper side of the housing 1 is a rim 16 of larger outside diameter than the groove 15a in the member 7, so that when the rim is telescoped within the groove, an air tight connection is made. The opening 4 in the top of the housing 1 is of smaller diameter than the check valve disc 9a so that any gas or liquid flowing up through the opening 4 strikes the center of the disc 4a and forces it more tightly shut. If the opening 4 were off center, there would be a chance for the disc 9a to become unsealed at one edge.

On the upper side of the unit 7a, is a filter unit 17 having perforated top and bottom walls 18, 19 through which air flows and an imperforate cylindricat outer wall 20 of larger diameter than the rim 6a so that when seated within the rim, an air tight connection is made. All of the air flowing through the filter 17 must accordingly flow through the filter material arranged between the top and bottom walls.

An inverted cup shaped cover 21 is telescoped over the upper end of the filter and depends around the housing 1 and the upper and lower rubber members 7 and 7a. At the top of the cover 21 are indents 22 which rest on the upper edge of the filter element 17. This provides a slight space between the top of the cover and the upper wall 18 of the filter. A similar spacing is obtained within the depending side walls of the cover by integral projections 23 and 23a on the rubber members 7 and 7a. This results in an annular passage 24 inside the cover which permits adequate flow of air upward around the outside of the filter to the top wall 18 of the filter cartridge. This passage is sufficiently narrow to provide a dead air space preventing excessive circulation of room air which might carry contaminants of gaseous or particulate nature to the filter and cut down the life of the filter cartridge.

When installed on a distilled water storage tank, the withdrawal of water from the tank creates a suction at the nipple 2 which draws air up through the annular space 24 inside the cover and down through the filter cartridge 17 and check valve 9a. The same suction which unseats the check valve 9a holds the check valve 9 more tightly seated so that there is no possibility of contaminated air reaching the nipple 2 for discharge to the tank. When the tank is filled, the air within the tank displaced by the incoming water flows out through the nipple 2 and down through the check valve 9 and funnel 11. The pressure of the outflowing air acts on the upper side of the check valve 9 and forces it open. The same pressure acts on the under side of the check valve 9a and forces it more tightly closed. The outflowing air from the storage tank may be moist and may contain drops of water. It is important that these be kept out of the filter cartridge 17 because moisture cuts down the useful life. Under some conditions, the outflowing air may contain high velocity water spray. This is deflected downwardly by the deflector 5 built into the body 1 of the filter. Should any of this spray flow up through the opening 4, it would strike against the center of the check valve disc 9a and force it more tightly closed. In case of over filling, water will flow out the nipple 2 and this, likewise, is deflected downward by the deflector 5 and passes out through the check valve 9 and funnel 13.

What is claimed as new is:

1. An air filter for water storage tanks and the like comprising an inverted cup shaped housing having an opening in one side for connection to a tank into which air is to be admitted as water is withdrawn, a rubber member below and extending across the rim of the housing and having on its upper side a cylindrical wall in air tight telescoping engagement with the rim, a funnel below said member, said member having on its under side a wall in telescoping engagement with the rim of the funnel, said member having openings extending through a central part from top to bottom and a downwardly opening check valve normally held against the under side of said member and covering said openings, a central opening in the top of the housing, an upwardly extending cylindrical wall on the top of the housing, another rubber member extending over the top of the housing and having on its under side a wall in air tight telescoping engagement with said last mentioned cylindrical wall, said other member having openings extending through the central part thereof from top to bottom and a downwardly opening check valve normally held against the under side of said other member and covering said openings, a filter cartridge having an imperforate outer wall and top and bottom walls through which air flows, said other member having on its upper side a cylindrical wall in air tight telescoping engagement with the outer wall of the filter cartridge, and a cover having walls extending over the top of the filter cartridge and depending around the sides of the filter and spaced therefrom to provide a dead air space open at the bottom from which air is drawn through the filter.

2. An air filter for water storage tanks and the like comprising an inverted cup shaped housing having an opening in one side for connection to a tank into which air is to be admitted as water is withdrawn, a deflector within the housing for directing downward fluid flowing into the housing through said opening, a rubber member below and extending across the rim of the housing and having on its upper side a cylindrical wall in air tight telescoping engagement with the rim, a funnel below said member, said member having on its under side a wall in telescoping engagement with the rim of the funnel, said member having openings extending through a central part from top to bottom and a downwardly opening check valve normally held against the under side of said member and covering said openings, a central opening in the top of the housing, an upwardly extending cylindrical wall on the top of the housing, another rubber member extending over the top of the housing and having on its under side a wall in air tight telescoping engagement with said last mentioned cylindrical wall, said other member having openings extending through the central part thereof from top to bottom and a downwardly opening check valve normally held against the under side of said other member and covering said openings, said last mentioned check valve being of diameter larger than the central opening in the top of the housing and positioned so that fluid flowing through the central opening strikes the center of the check valve, a filter cartridge having an imperforate outer wall and top and bottom walls through which air flows, said other member having on its upper side a cylindrical wall in air tight telescoping engagement with the outer wall of the filter cartridge, and a cover having walls extending over the top of the filter cartridge and depending around the sides of the filter and spaced therefrom to provide a dead air space open at the bottom from which air is drawn through the filter.

3. An air filter for water storage tanks and the like comprising a housing having an inlet opening at the top, a discharge opening at the bottom and an opening at one side for connection to a tank into which air is to be admitted as water is withdrawn, a rubber member below and extending across the discharge opening, said member having on its upper side a cylindrical wall in air tight telescoping engagement with the housing, said member having openings extending through it from top to bottom and a downwardly opening check valve normally held against the under side of said member and covering said openings, a central opening in the top wall of the housing, another rubber member extending over the top of the housing and having a wall in air tight engagement with the top of the housing, said other member having openings and a downwardly opening check valve normally held against the under side of said other member and covering said opening, a filter cartridge having an imperforate outer wall and perforate top and bottom walls through which air flows, said other member having on its upper side a cylindrical wall in air tight engagement with said outer wall, and a cover having walls extending over the top of the filter cartridge and depending around the sides of the filter and spaced therefrom to provide a dead air space open at the bottom from which air is drawn through the filter.

4. An air filter for water storage tanks and the like comprising a housing open at the top and bottom and having a side opening for connection to a storage tank into which air is to be admitted as water is withdrawn, upper and lower rubber units respectively in air tight engagement with the top and bottom of the housing, each unit having openings extending through the unit from top to bottom and having associated therewith a downwardly opening check valve held against the under side of the unit and covering said openings, said units having outwardly extending circumferentially spaced projections, a filter cartridge having an outer imperforate wall and top and bottom walls through which air flows, an air tight connection between said outer imperforate wall and the upper unit, and a cover extending over the filter and depending around the sides of said units and spaced therefrom by said projections to provide a dead air space open at the bottom through which air is drawn into the filter.

References Cited in the file of this patent

UNITED STATES PATENTS

| | | |
|---|---|---|
| 941,713 | Jacobs | Nov. 30, 1909 |
| 1,553,807 | Elliot | Sept. 15, 1925 |
| 2,675,886 | McMullen | Apr. 20, 1954 |
| 2,754,003 | Fenner | July 10, 1956 |